(12) United States Patent
Rogriguez et al.

(10) Patent No.: US 7,457,952 B2
(45) Date of Patent: Nov. 25, 2008

(54) AUTHENTICATION TAG FOR S/W MEDIA

(75) Inventors: Alberto Rogriguez, Webster, NY (US); Heiko Rommelmann, Penfield, NY (US); Scott Bell, Rochester, NY (US); Will Phipps, Fairport, NY (US); Ron Boucher, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 736 days.

(21) Appl. No.: 11/012,478

(22) Filed: Dec. 16, 2004

(65) Prior Publication Data

US 2006/0133609 A1    Jun. 22, 2006

(51) Int. Cl.
*H04L 9/00*    (2006.01)
*H04K 1/00*    (2006.01)
(52) U.S. Cl. .................... 713/168; 380/270; 380/44
(58) Field of Classification Search ......... 380/200–201, 380/270, 44; 713/168–170, 192–194
See application file for complete search history.

(56) References Cited

U.S. PATENT DOCUMENTS 6,640,145 B2*  10/2003  Hoffberg et al. ............. 700/83
6,684,199 B1*  1/2004  Stebbings .................... 705/57
7,099,479 B1*  8/2006  Ishibashi et al. ............. 380/281
7,159,775 B2*  1/2007  Aoki et al. .................... 235/451

* cited by examiner

*Primary Examiner*—Hosuk Song
(74) *Attorney, Agent, or Firm*—Oliff & Berridge, PLC

(57) ABSTRACT

An authentication apparatus includes a reading or recording medium equipped with an authentication tag, and a reading and recording drive that includes a transmitter and a coupler chip, wherein the authentication tag and the transmitter are capable of communicating with each other when the reading medium or the recording medium is coupled to the reading and recording drive. An authentication method includes providing a reading medium or a recording medium with an authentication tag, providing a reading and/or recording drive with a transmitter and a communication interface wherein the authentication tag and the transmitter are capable of communicating with each other when the reading medium or recording medium is coupled to the reading and/or recording drive, and authenticating the reading medium or recording medium via a communication between the authentication tag and the transmitter.

26 Claims, 3 Drawing Sheets

AUTHENTICATION TAG FOR S/W MEDIA

Co-pending applications with Ser. Nos. 11/034,249, 11/034,248, 11/013,798, 11/012,480, 10/978,423, 11/012,479, 11/034,058 and 11/013,703 are incorporated herein in their entirety by reference.

BACKGROUND OF THE INVENTION

1. Field of Invention

The present invention relates generally to RFID (Radio Frequency Identification Document) readers, and is specifically related to authentication tags provided on removable system parts.

2. Description of Related Art

Replaceable unit monitors (RUMs) are increasingly being used in machines to monitor the status of replaceable sub-assemblies, otherwise known as consumer replaceable units (CRUs). Printers, copiers, fax machines, and image forming apparatus in general, may have a number of CRUs including fuser modules, print cartridge and a toner bottles. A RFID transponder, or tag, mounted on each sub-assembly, may communicate with a unique coupler device via a dedicated antenna that may be placed in close proximity to the RFID tag. A host computer or ASIC (Application Specific Integrated Circuit), in communication with each individual coupler device, interrogates the status of each RFID tag.

An exemplary system and method for controlling communications in a security system based upon RFID techniques is discussed in U.S. Patent Application No. 2004/0160309. The RFID reader is provided with multiple modulation techniques, multiple antennas, and the capability to vary its power level and carrier frequency.

U.S. Patent Application No. 2003/0141962 discloses an apparatus and method for locating an RFID transponder and includes a plurality of antennas for receiving identification data broadcast by the RFID transponder.

Another exemplary method and apparatus for tracking items with a RFID tag is disclosed by U.S. Pat. No. 6,714,121. This patent includes passive RFID tags, interrogators with several antenna inputs connected to the sensing antennas in order to multiplex the antenna signals, and a host computer in communication with the interrogators.

Another RFID system is disclosed by U.S. Pat. No. 6,600,420, which includes multiple antennas, at least one of which can be selected to facilitate the interrogation of RFID elements, a control system for addressing antennas sequentially so that the antenna system can determine the order of the tagged items.

U.S. Pat. No. 6,317,027 further discloses a proximity reader for a RFID system that is programmed to determine and store optimum antenna impedance values to achieve peak antenna resonance at each of multiple operating frequencies.

Finally, U.S. Pat. No. 6,069,564 discloses an exemplary design of a multi-directional RF (radio frequency) antenna comprising a plurality of coils adapted to communicate to a source, such as an RFID tag. The antenna includes a switch for selecting at least one of the RF antenna coils for transmission of the RF signals and receipt of the RF response signals.

All of the references indicated above are herein incorporated by reference in their entirety for their teachings.

Also, software piracy is an increasing issue for companies that make software applications and games. In the past, software manufacturers have relied on the use of specially formatted media, or on license key numbers that need to be input to the application for installation on a user's computer. Sometimes, critical data is provided in areas of a media such as, for example, a CD or a DVD, that are not accessible by standard operation system utilities or software applications that are designed for copying files. For example, some applications such as games won't even launch unless the media is in the drive, and if the media is removed from the drive, then the application shuts down. However, in this case, the hidden data is static and once the data location on the media is found, then the system is broken. Moreover, by sharing the license key number, several users can use and/or install multiple copies of a software.

SUMMARY OF THE INVENTION

Various exemplary implementations of systems, methods and devices provide an authentication apparatus that includes a reading and recording medium with a tag and a reading and recording drive that includes a transmitter and a communication interface with a coupler chip, wherein the tag and the transmitter are capable of communicating with each other.

Moreover, various exemplary implementations provide an authentication method that includes providing one of a reading medium and a recording medium with an authentication tag, and providing a media reading and recording drive with a transmitter and a communication interface that includes a coupler chip, wherein the authentication tag and the transmitter are capable of communicating with each other when one of the reading medium and the recording medium is coupled to the media reading and recording drive.

Moreover, various exemplary implementations provide an authentication method that includes issuing an authentication command to the coupler chip, generating cryptography data via a cryptography algorithm using the coupler chip, generating a set of drive keys using the coupler chip, providing a set of tag keys to the coupler chip using the authentication tag, and comparing the drive keys with the tag keys. Furthermore, various exemplary implementations include running the set of drive keys through the tag cryptography algorithm, and comparing the encrypted set of drive keys to the generated tag cryptography data.

Also, various exemplary implementations include a controller, one of a reading medium and a recording medium that includes a tag and is controlled by the controller, and a media reading and/or recording drive that includes a transmitter and a coupler chip controlled by the controller, wherein the controller controls authentication communication between the tag and the transmitter when the reading and recording medium is coupled to the reading and recording drive.

DETAILED DESCRIPTION

Figure 1A:
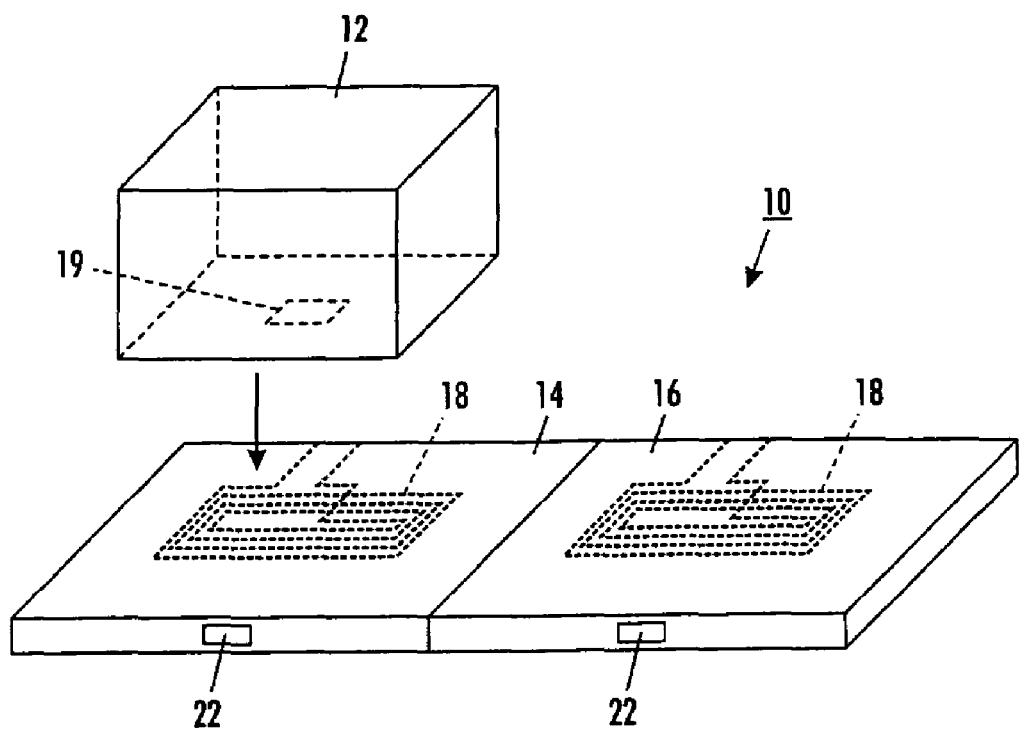
FIGS. 1A and 1B are perspective drawings of a dual nesting station with a container having an RFID tag embedded therein.
Figure 1B:
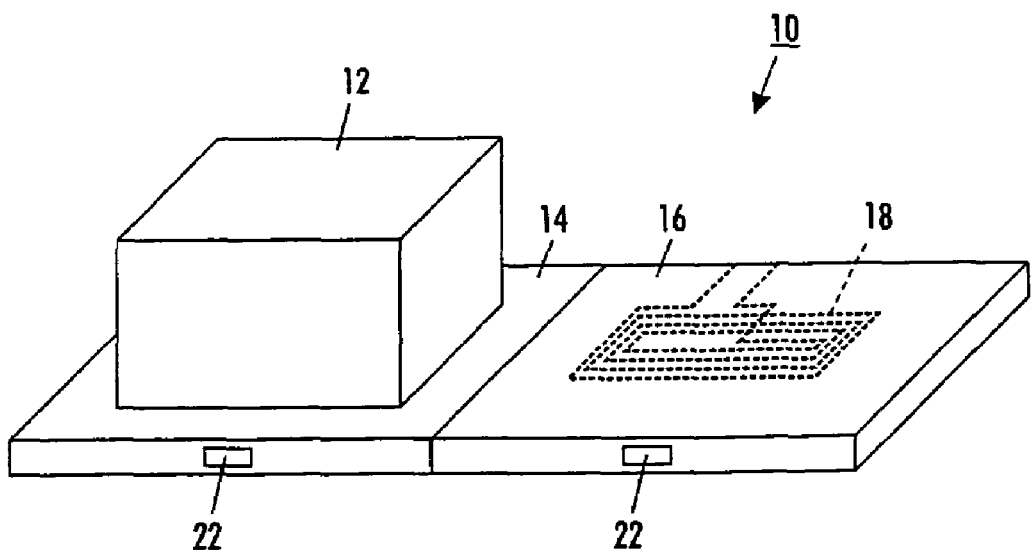

An implementation of a portion of an exemplary container tracking and identification system is shown in FIGS. 1A and 1B. Referring to FIG. 1A, a dual nesting station 10 is shown upon which an item or container 12 may be placed. The dual nesting station contains two locations 14 and 16, where containers may be placed and tracked. A dual nesting station 10 is shown as an exemplary implementation, however, those skilled in the art will readily recognize that a single nesting station 14 may be implemented, or any plurality of nesting stations may be implemented. The nesting stations 14 and 16 may be implemented as a generally flat component which may be placed wherever there is a need to track a container, or it may be formed as an integral part of a shelf, pallet, bench, table, or any other location where items or containers are located.

Each nesting station may include an antenna 18 imbedded within, or placed upon, each nesting stations 14 and 16. Other circuitry, not shown in FIGS. 1A and 1B, may be used to send and receive signals to and from an RFID tag 19 imbedded within, or placed upon, the container 12. When the container 12 is placed in proximity to the nesting station 14, communication of signals between the container RFID tag 19 and the antenna 18 becomes then possible.

Figure 2:
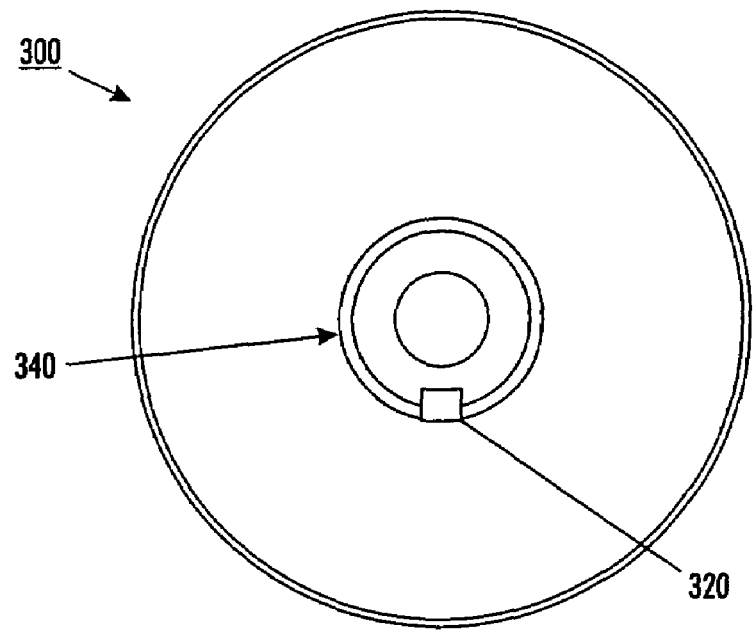
FIG. 2 is an illustration of an exemplary CD or DVD medium with an authentication tag and an antenna.

FIG. 2 is an illustration of an exemplary CD or DVD medium 300. The medium 300 comprises an authentication tag 320 and an antenna 340. Similarly to the above-described circuitry, the tag 320 and the antenna 340 may be embedded in the medium 300. The tag 320 may contain a cryptography algorithm that may be used by an installation utility or a software application in order to validate the authenticity of the medium 300 when coupled to a medium recording or reading drive. The medium 300 does not have to be coupled to the drive at all times, but only needs to be coupled to the drive whenever needed, for example, by the authentication application. The application may require authentication of the medium 300, for example, at random intervals.

Figure 3:
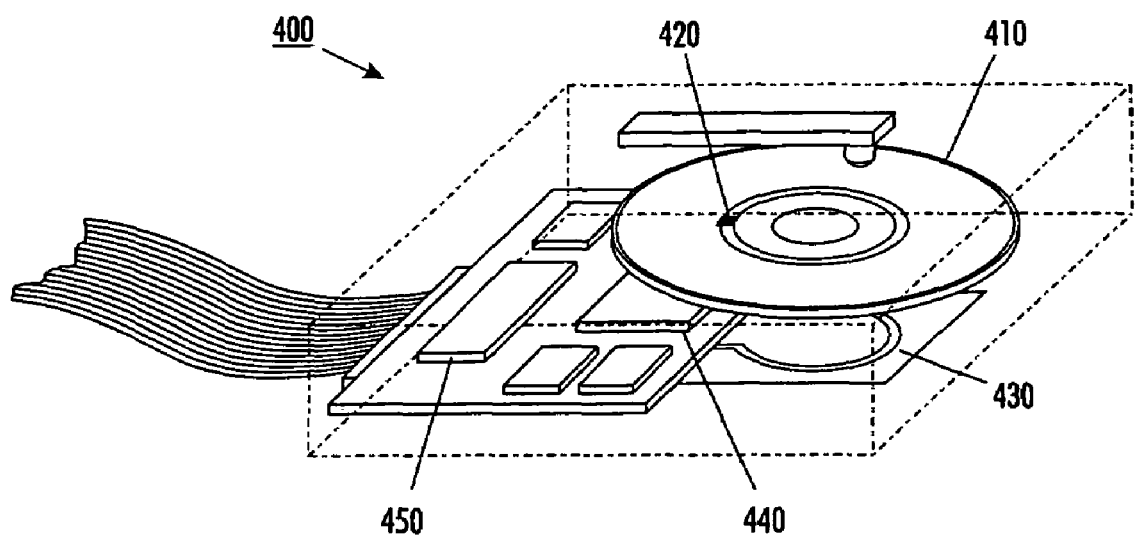
FIG. 3 is an illustration of an exemplary authentication system.

FIG. 3 illustrates an exemplary authentication system 400. The authentication system 400 may comprise a medium 410 equipped with an authentication tag 420, an antenna board 430, a radio frequency coupler chip 440, and an interface board 450. Similarly to a CRUM monitoring the activity of a CRU, the authentication tag 420 on the medium 410 communicates with the coupler chip 440 present on the medium reader in order to authenticate the medium 410 before being used in the system 400. The coupler chip 440 may be controlled by the interface board 450 during the authentication process. The coupler chip 440 and the authentication tag 420 may also be designed to randomly trigger authentication based on an internal algorithm, timer, counter, and the like. As such, any attempts to bypass the security algorithms by physical modification would be more difficult because the medium 410 such as, for example, a CD/DVD player, and the firmware of the host device would have to be modified. An interrupt output signal from the interface board 450 may also be added to indicate to the host that the authentication sequence has been triggered.

The authentication tag 420 embedded in the medium 410 may serve other purposes besides authentication, which guards against counterfeiting. The authentication tag 420 can contain information that supports other security features such as, for example, regional codes, country codes and zone locks. These features are intended to provide control over the release of copyrighted material in different geographical regions at different times. They may also be used to insure, for example, market exclusivity as agreed between a distributor and an owner of the copyrighted material. These codes can be stored, for example, in the Read Only Memory (ROM) or in a One Time Programmable memory (OTP), and programmed during the manufacture (recording) of the medium 410 and may only be read after a successful authentication sequence. In addition, the tag can store a counter indicating the number of times a software application or game can be installed. For example, as the user installs the software, the counter is decremented. This feature may be used to control the number of times an application or game is installed. If the maximum number of installations is exceeded, the installation application may refuse to install the application or the game. It may also be possible to erase the tag memory after a number of illegal installations are attempted, and thus removing any record from the tag of any stored information critical for the application or game to run.

It is also possible to store in the authentication tag 420 encryption/decryption keys for reading and recording encrypted data or any other information essential to the use and, or access of, the stored information. A similar approach may be used to integrate the medium 410 with authentication tag 420 into the Content Protection System Architecture (CPSA) umbrella. CPSA is essentially the framework under which, for example, the DVD family security features fall. An example of CPSA is the Content Protection for Recordable Media (CPRM). In CPRM, a unique ID is recorded in a special zone of the medium 410 such as, for example, a DVD, and later used for encrypting the data recorded in the medium 410. If the content of the medium 410 is copied to another DVD, the unique ID may be different, or missing, and the DVD player may fail to reproduce the contents. In the case of a medium 410 with an authentication tag 420, the unique Media ID can be stored in a protected memory of the authentication tag 420. The requirement of achieving a successful authentication before accessing the memory of the authentication tag 420, and therefore the unique ID necessary for the content decryption, adds an additional level of security to the system.

The coupler chip and authentication tag 420 may preferably incorporate encryption, decryption and other security mechanisms directly in the silicon vs. a firmware implementation as added security. Also, it is possible to implement the chipset (coupler chip 440 and authentication tag 420) with several variants of the authentication or security algorithms, or several different algorithms, that can be invoked at random times in order to further obfuscate attempts to break the security algorithms.

Figure 4:
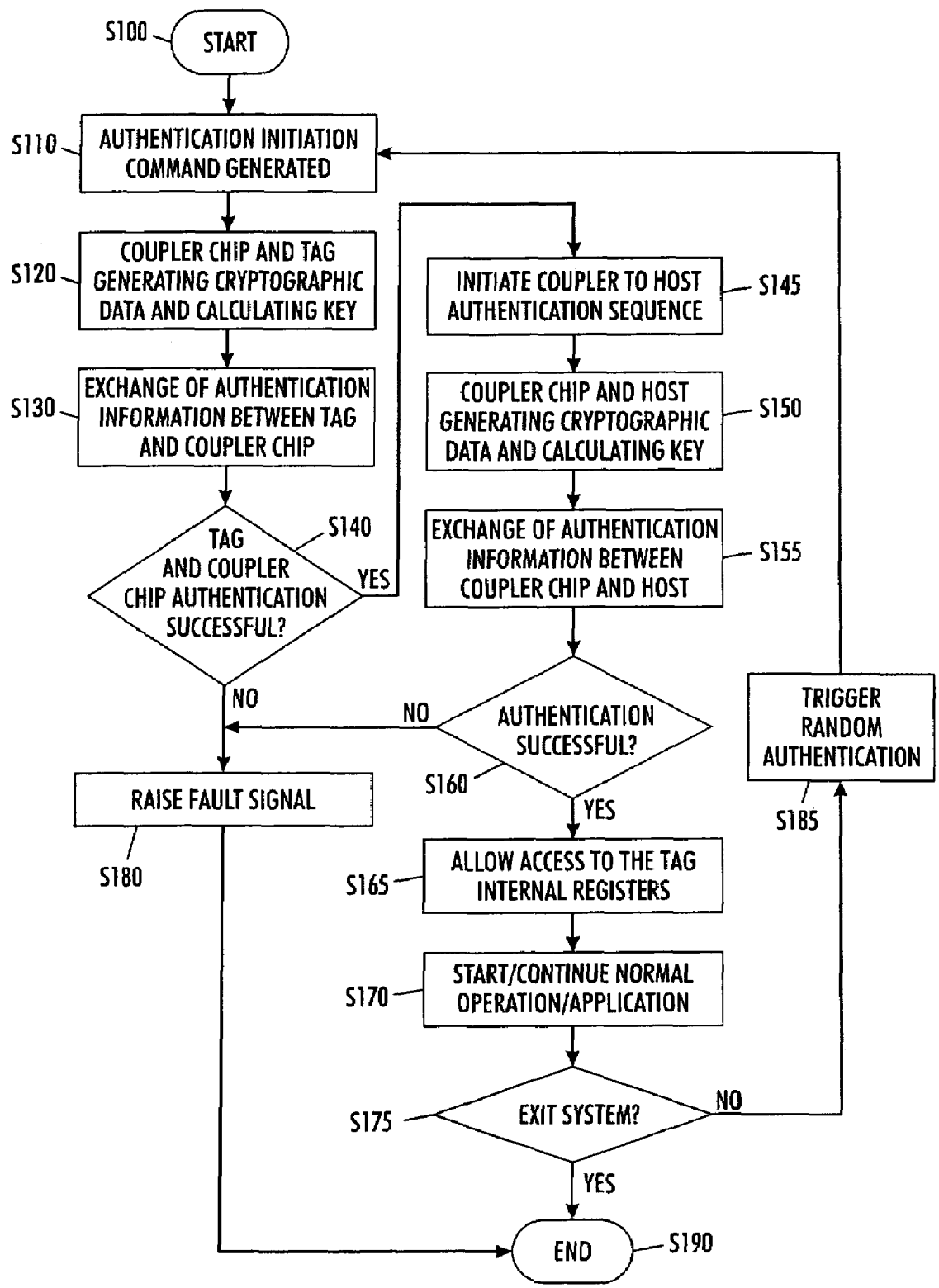
FIG. 4 is a flowchart illustrating an exemplary authentication method.

FIG. 4 is a flowchart illustrating an exemplary authentication method. In FIG. 4, the method starts in step S100, for example, when a CD or DVD medium is inserted into a drive. Next, control continues to step S110, where an authentication command is submitted to the coupler chip. During this step, a special installation utility may invoke the authentication mechanism of the tag prior to installation of the CD or DVD medium. Next, control continues to step S120, where the coupler chip generates cryptography data via a cryptography algorithm and a set of drive keys. The encryption algorithm to generate the cryptography data may be unique to the specific application such as, for example, a CD or DVD.

Next, control continues to step S130. In step S130, a set of tag keys, which are generated by the authentication tag, are exchanged with the coupler chip. The drive keys and the tag keys may then be compared to each other. Next, control continues to step S140, where a comparison is made between the drive keys, generated by the coupler chip, and the tag keys, generated by the authentication tag. If the drive keys and the tag keys correspond to each other, then control continues to step S145, where the authentication sequence is initiated between the coupler chip and the host device. Next, control continues to step S150, where the coupler chip and the host generate cryptographic data and calculate a key. Next, control continues to step S155, where authentication information is exchanged between the coupler chip and the host device. Next, control continues to step S160, where a determination of the success of the authentication is made. If the cryptography data generated by the coupler chip corresponds to the cryptography data generated by the host, the authentication is successful and control continues to step S165, where access to the internal registers of the authentication tag is allowed. Next, control continues to step 170, where normal operation of the CD, DVD or software is started or allowed to continue running.

If in step S140 the drive keys in the coupler chip are different than, or do not correspond to, the drive keys in the authentication tag, then control jumps to step S180, where a fault signal may be generated. The fault signal may be generated, for example, by locking up the driver, displaying a fault message, and the like. After generating the fault signal in step S180, control continues to step S190, where the method ends.

If in step S160 the authentication is not successful, then control jumps to step S180, where a fault signal may be generated. The fault signal may be, for example, locking up the driver, displaying a fault message, and the like. After generating the fault signal in step S180, control continues to step S190, where the method ends.

Following step S170, control continues to step S175, where a determination is made about whether to exit the CD or DVD or software application. If the determination is made to decline exiting the system and continues using the CD, DVD or software, then control continues to step S185, where an authentication routine as described above is triggered at random, then control returns to step S110 to execute the authentication routine anew. If the determination is made to exit the CD, DVD or software, then control continues to step S190, where the method ends.

While the present invention is described above in connection with various implementations thereof, it will be understood that such details are exemplary and not limiting. On the contrary, various alternatives, modifications and equivalents of the details and implementations described above are contemplated.

What is claimed is:

1. An authentication apparatus, comprising:
   at least one of a reading medium and a recording medium that comprises an authentication tag configured to generate a set of tag keys; and
   a reading and/or recording drive that comprises a transmitter and a communication interface, the at least one reading and/or recording drive being configured to generate cryptography data via a cryptography algorithm, to generate a set of drive keys, and to compare the drive keys with the tag keys,
   wherein the authentication tag and the transmitter are capable of communicating with each other when the at least one of a reading medium and a recording medium is coupled to the reading and/or recording drive.

2. The apparatus of claim 1, wherein the tag and the transmitter communicate with each other wirelessly.

3. The apparatus of claim 2, wherein the tag and the transmitter communicate with each other wirelessly via encrypted communication.

4. The apparatus of claim 1, wherein the tag contains information for at least one of a proper installation and a proper operation of the at least one of a reading medium and a recording medium.

5. The apparatus of claim 1, wherein the at least one of a reading medium and a recording medium comprise at least one of a CD and a DVD.

6. The apparatus of claim 1, wherein the tag comprises an authentication mechanism that uses cryptography.

7. The apparatus of claim 6, wherein the authentication mechanism is separate from the reading and/or recording drive.

8. The apparatus of claim 1, wherein the communication interface comprises a coupler chip.

9. The device of claim 1, wherein the authentication tag comprises a counter that counts a number of times the at least one of a reading medium and a recording medium is installed.

10. An authentication method, comprising:
    providing at least one of a reading medium and a recording medium with an authentication tag;
    providing a reading and/or recording drive with a transmitter and a communication interface, the authentication tag and the transmitter being capable of communicating with each other when the at least one of a reading medium and a recording medium is coupled to the reading and/or recording drive; and
    authenticating the at least one of a reading medium and a recording medium via a communication between the authentication tag and the transmitter,
    wherein the communication between the authentication tag and the transmitter comprises:
       issuing an authentication command to the transmitter;
       generating cryptography data via a cryptography algorithm using the transmitter;
       generating a set of drive keys using the transmitter;
       providing a set of tag keys to the transmitter using the authentication tag; and
       comparing the drive keys and the tag keys.

11. The method of claim 10, wherein the communication between the authentication tag and the transmitter is wireless.

12. The method of claim 10, wherein the communication between the authentication tag and the transmitter takes place between the authentication tag and a coupler chip that is part of the transmitter.

13. The method of claim 12, further comprising:
    running the set of drive keys through the tag cryptography algorithm; and
    comparing the encrypted set of drive keys to the generated tag cryptography data.

14. The method of claim 13, further comprising:
    comparing a unique coupler chip key to a unique drive key.

15. The method of claim 13, further comprising:
    comparing a unique coupler chip key to a unique tag key.

16. The method of claim 12, wherein the set of encryption keys are stored in at least one register of the reading and/or recording drive.

17. The method of claim 12, wherein issuing the authentication command is at least at one of the time of installation of the at least one of a reading medium and a recording medium, and a random time after the time of installation.

18. The method of claim 10, wherein the communication between the authentication tag and the transmitter takes place via an encrypted communication.

19. The method of claim 18, wherein the encrypted communication is performed using one or more encryption algorithms that are unique to the at least one of a reading medium and a recording medium.

20. The method of claim 19, wherein the one or more algorithms are triggered at random times.

21. The method of claim 10, wherein the authentication tag contains information for at least one of a proper installation and a proper operation of the at least one of a reading medium and a recording medium.

22. The method of claim 10, further comprising counting a number of times the at least one of a reading medium and a recording medium is installed.

23. The method of claim 10, wherein authenticating the at least one of a reading medium and a recording medium is initiated by one of at least the controller, the coupler chip and the tag.

24. A machine-readable medium that provides instructions for authenticating data, the instructions, when executed by a processor, cause the processor to perform the operations of claim 10.

25. An authentication system, comprising:
   a controller;
   at least one of a reading medium and a recording medium that comprises an authentication tag and is controlled by the controller, the tag being configured to generate a set of tag keys; and
   a reading and/or recording drive that comprises a transmitter and a communication interface that is controlled by the controller, the at least one reading and/or recording drive being configured to generate cryptography data via a cryptography algorithm, to generate a set of drive keys, and to compare the drive keys with the tag keys,
   wherein the controller controls authentication communication between the authentication tag and the transmitter when the at least one of a reading medium and a recording medium is coupled to the reading and/or recording drive.

26. The system of claim 25, wherein the communication interface comprises a coupler chip.

* * * * *